United States Patent [19]

Grube et al.

[11] 4,304,625
[45] Dec. 8, 1981

[54] CREPING ADHESIVES FOR THROUGH-DRIED TISSUE

[75] Inventors: Herbert E. Grube, Appleton; Terrence D. Ries, Menasha, both of Wis.

[73] Assignee: Kimberly-Clark Corporation, Neenah, Wis.

[21] Appl. No.: 93,500

[22] Filed: Nov. 13, 1979

[51] Int. Cl.³ ............................................. D21H 5/24
[52] U.S. Cl. .................................... 162/111; 162/112; 260/29.6 WA; 264/283
[58] Field of Search .............................. 162/111–113, 162/168 R; 264/282, 283; 260/29.6 WA

[56] References Cited

U.S. PATENT DOCUMENTS 3,812,000  5/1974  Salvucci et al. ................ 162/168 R
3,926,716 12/1975  Bates ............................... 162/168 R
4,063,995 12/1977  Grossman ........................ 162/112

Primary Examiner—Peter Chin
Attorney, Agent, or Firm—William D. Herrick; Howard Olevsky; Wendell K. Fredericks

[57] ABSTRACT

In the commercial production of tissue paper and the like a web, formed from a slurry of water and fiber, is creped while essentially (98%) dry, from a rotating cylindrical dryer. Adhesives are frequently employed to hold the web to the dryer surface and polyvinyl acetate-ethylene copolymer emulsions serve this function. Such adhesives are relatively soft, tend to adhere to the fabrics which carry the paper web to the dryer surface and tend to make cleaning of the carrying fabric difficult. Additionally, these adhesives tend to cause blocking of the tissue paper when in roll form and adjacent plies of the paper tend to be torn upon separation. However, it has been found that by providing an adhesive creping composition to have between about 10% to 33% by weight of a water soluble polyvinyl alcohol, based on polyvinyl acetate-ethylene copolymer solids present in the composition, the cleanability of the carrying fabric is improved, roll blocking is minimized and the consistency of the adhesion of the drying web to the dryer is improved. Additionally, the tendency of the polyvinyl alcohol which itself has adhesive properties, to foul the dryer with a hard uneven film of alcohol is overcome.

5 Claims, 4 Drawing Figures

CREPING ADHESIVES FOR THROUGH-DRIED TISSUE

BACKGROUND OF THE INVENTION

This invention relates to the manufacture of soft, absorbent tissue paper webs and particularly to the mode of creping of such webs to attain adequate softness and adhesive characteristics in the web while minimizing operational difficulties.

It is known in the art to form a thin paper web from a slurry of water and fiber, to dewater and at least partially dry the web and then present the same on a carrying fabric to a large steam-heated rotary drum termed in the art a Yankee dryer. The web commonly enters the dryer at a circumferential dryer position which is well around the dryer from the zone of web exit and the exit zone is equipped with a creping blade against which the web abuts to be pushed backwardly upon itself to attain the well known tissue crepe structure.

The creping action requires that the web be well adhered to the dryer to effect a consistent and uniform creping action, and for example, to prevent flaring of the web from the dryer before or at the zone of the creping blade. In some instances the web is presented to the dryer at a considerable moisture content that is as high as about 60%. Such web has a fiber consistency then upon dryer entry of about 40%. This moisture content depending upon the condition of the web surface and the Yankee dryer surface may tend to cause the web to adhere strongly to the dryer throughout the drying action. Under such circumstances, there is usually no requirement for the use of a supplemental adhesive such as the acetates or alcohols and in fact, on some occasions the adhesion to the dryer may be so tight that a release agent rather than an adhesive is applied between the dryer and the web to limit the extent of the adhesion.

In some modes of operation commonly referred to as through-drying the contact of the drying web with the dryer surface is limited. In a through-drying operation, the web formed from the slurry of water and fiber is dewatered without significant pressing of the wet web and this is followed by a drying action in a hot air blast. Such webs are then pressed to the Yankee dryer using a knuckled fabric so that the web adheres to the dryer in closely spaced zones, with bulking of the web between the zones. Fabrics having as fine a count as 4,900 openings per square inch and above may serve the purpose. The fiber consistency of such webs when presented to the dryer may be between about 30 and 90%. The higher fiber consistency webs will commonly require, and others may require, an adhesive to adequately secure the web to the dryer for both the completion of the drying action and for the creping action.

A variety of adhesives have been employed for retaining a web on a dryer surface. These include the polyvinyl acetate-ethylene copolymer emulsions and aqueous polyvinyl alcohol solutions. It has been found that the polyvinyl acetate-ethylene copolymer compositions (which may contain small percentages of polyvinyl alcohol, that is less than about 5% of the total solids by weight) are generally adequate for the purpose but have a number of undesirable effects.

Similarly, polyvinyl alcohol characterized by a degree of hydrolysis, has certain limitations tending to obviate it's use as the sole adhesive for retention of the web.

With more specific reference to the polyvinyl acetate-ethylene copolymers such tend to be retained on the creped paper web on the side which engages the dryer and when the creped web is rolled or rolled and plied with another web to form a sheet the surface or surfaces carrying the residual acetate tend to adhere causing blocking in the roll. Such blocking has additional detrimental effects in light weight tissues for if any minor edge defect or small hole occurs in a sheet the effort to separate the blocked plies results in tear outs from the web, complete web breaks and even ply reversal, that is the attachment of a ply to an adjacent sheet.

Additionally, it has been found that the fabric which carries the web to the dryer may become contaminated with the copolymer and this is difficult to remove with conventional cleaning actions due to the resistance to water of the copolymers.

In contrast to the polyvinyl acetate-ethylene copolymer the polyvinyl alcohols having a significant degree of hydrolysis tend to be water soluble and also tend to be unaffected by most organic solvents. The polyvinyl alcohols (which may contain some residual polyvinyl acetate) tend to coat the dryer with a hard and uneven film which builds up as drying and creping proceed resulting in uneven creping. Additionally, to remove the hard film, a cleaning blade is frequently used against the dryer surface causing dryer surface wear.

SUMMARY OF THE INVENTION

This invention is based upon the finding that when a polyvinyl alcohol creping adhesive is modified with an excess of an polyvinyl acetate-ethylene copolymer emulsion, that the difficulties attributable to the use of copolymer itself and the alcohol are largely overcome. Suitably, the final composition has between about 10 to 33% of the hydrolyzed polyvinyl alcohol solids based on the solids of the polyvinyl acetate-ethylene copolymer. With such a composition blocking in the finished or hard rolls is largely eliminated; the adhesive retained by the process fabrics may be largely and sometimes completely removed with water applied as a needle shower; and the adhesion to the dryer, particularly of through-dried webs knuckled to the dryer, is much more uniform leading to consistency in the crepe of the product. The combination of polyvinyl acetate-ethylene copolymer with partially hydrolyzed grades of polyvinyl alcohol is also desirably selected to accomplish a primary objective of the invention, that is, to provide the combination to have hot tack properties found to be desirable in machine operation. Generally, the desired hot tack properties are developed in the dryer temperature range of about 160° F. to 240° F. and basically the copolymer and alcohol combination is provided to obtain good film strength in this temperature range with a preferred range 180° F. to 220° F. to result in fine and uniform tissue creping in the product.

BRIEF DESCRIPTION OF THE DRAWINGS

The invention will be more fully understood by reference to the following detailed description and accompanying drawings in which.

DETAILED DESCRIPTION OF THE DRAWINGS

Figure 1:
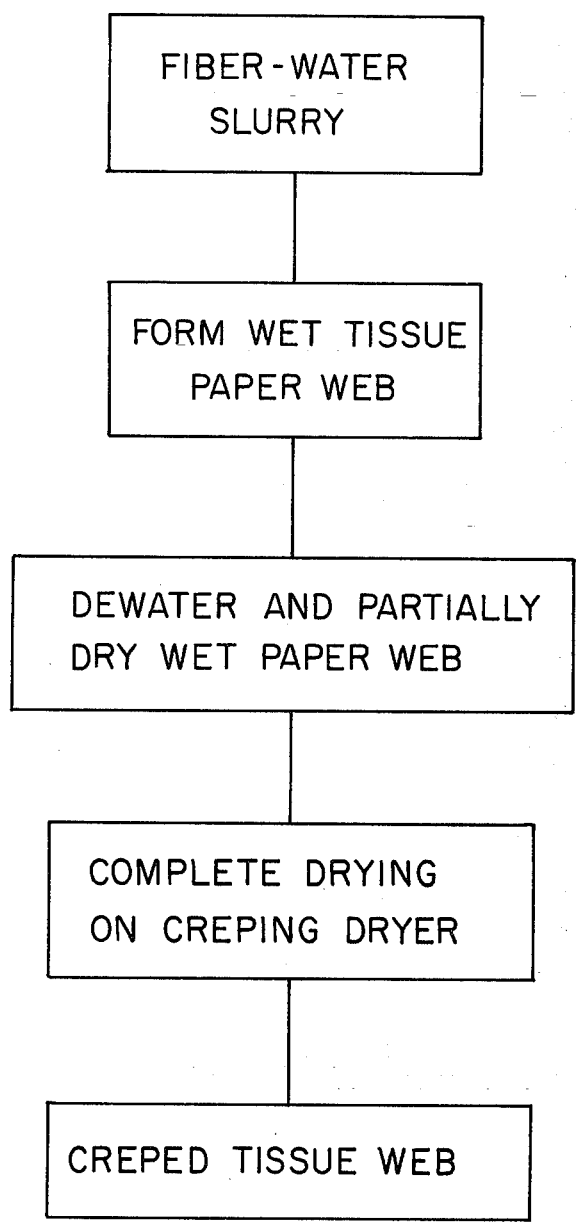
FIG. 1 is a block diagram illustrating steps in the formation of a creped tissue web from a fiber-water slurry.

Referring now to the drawings more in detail FIG. 1 sets out conventional steps in the formation of a tissue paper web suitable for use as facial tissue, toilet tissue, sanitary napkin wrappers and the like. Such webs have a finished basis weight in the range of about 7 to about 40 pounds per 3,000 square feet and are formed from aqueous fiber slurries. In specific application such a slurry may have a fiber content by weight of about 0.3% and the slurry is directed to a conventional Fourdrinier drainage wire to form the web; dewatering occurs through the wire in conventional manner and the web at a fiber consistency of about 27% is directed to through-drying equipment. The web exiting from the through-dryer is at a fiber consistency of about 80% and is passed to a transfer and impression fabric which carries the web to the creping dryer. Such a transfer fabric in this specific described application is characterized by about 78 meshes per inch in the machine direction, 72 meshes per inch in the cross-direction and the impression fabric knuckles act to compact about 20% of the surface of the web on the creping or Yankee dryer. The web is creped from the dryer at a fiber consistency of about 95% and is wound into rolls.

Figure 2:
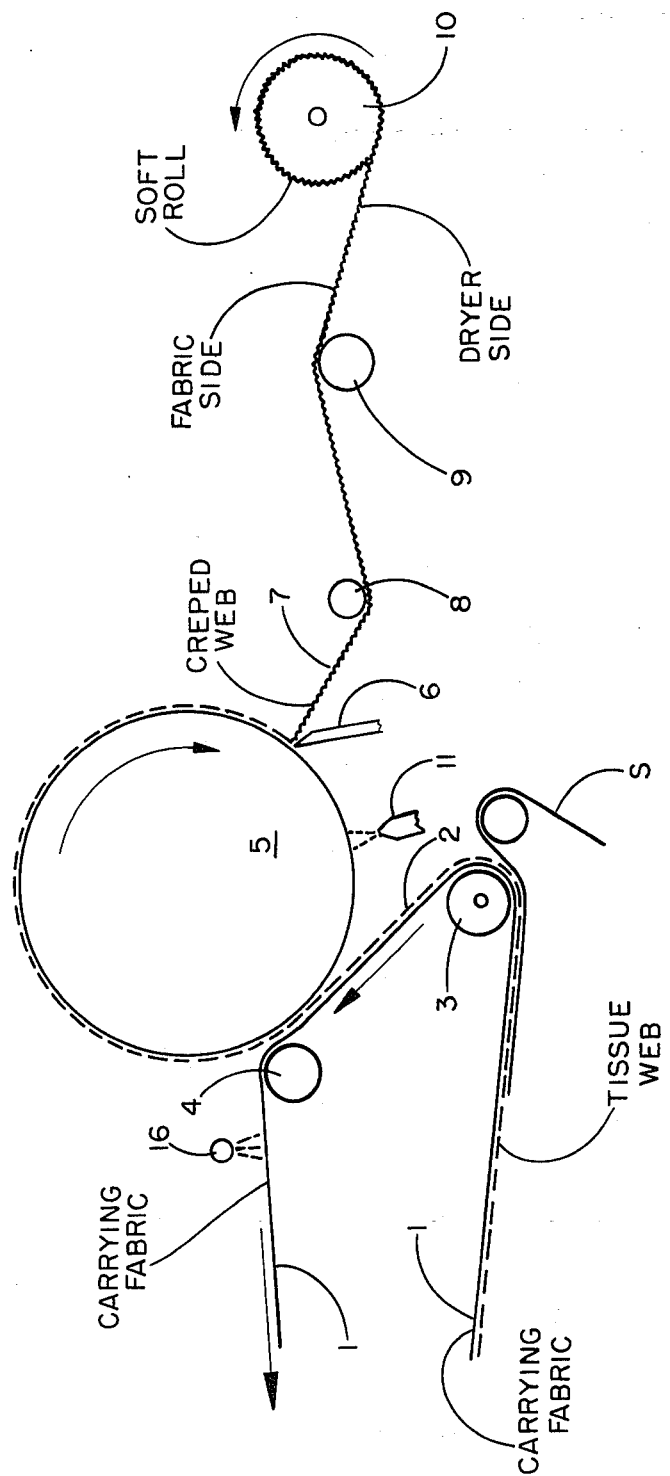
FIG. 2 is a schematic illustration of a Yankee dryer to which a tissue web is presented dried, creped and then wound into a soft roll.

Referring to FIG. 2 the transfer and impression fabric designated at 1 carries the formed, dewatered and partially dried web 2 around turning roll 3 to the nip between press roll 4 and Yankee dryer 5. A supplemental lower carrier designated at S may also be employed to carry the web in sandwich fashion and such is particularly useful at the higher web drynesses. The fabric, web and dryer move in the directions indicated by the arrows. The entry of the web to the dryer is well around the roll from creping blade 6 which, as schematically indicated, crepes the traveling web from the dryer as indicated at 7. The creped web 7 exiting from the dryer passes over guide and tension rolls 8, 9 and is wound into a soft creped tissue roll 10.

To adhere the relatively dry web 2 (80% fiber consistency) entering the dryer to the surface of the dryer a spray 11 of adhesive is applied to the surface ahead of the nip between the press roll 4 and Yankee 5. This spray may be applied to the traveling web 2 directly but it has been found preferable to direct the spray to the dryer to limit the pickup of adhesive by the web and to limit the penetration of adhesive through the web to the carrying fabric.

The spray is aqueous and suitably has a solids content of the polyvinyl acetate-ethylene copolymer and polyvinyl alcohol composition of about 1%. For spraying a range of solids content of about 0.75 to 1½% is useful. For roll coating of the adhesive, or knife coating higher solid contents may be employed.

Figure 3:
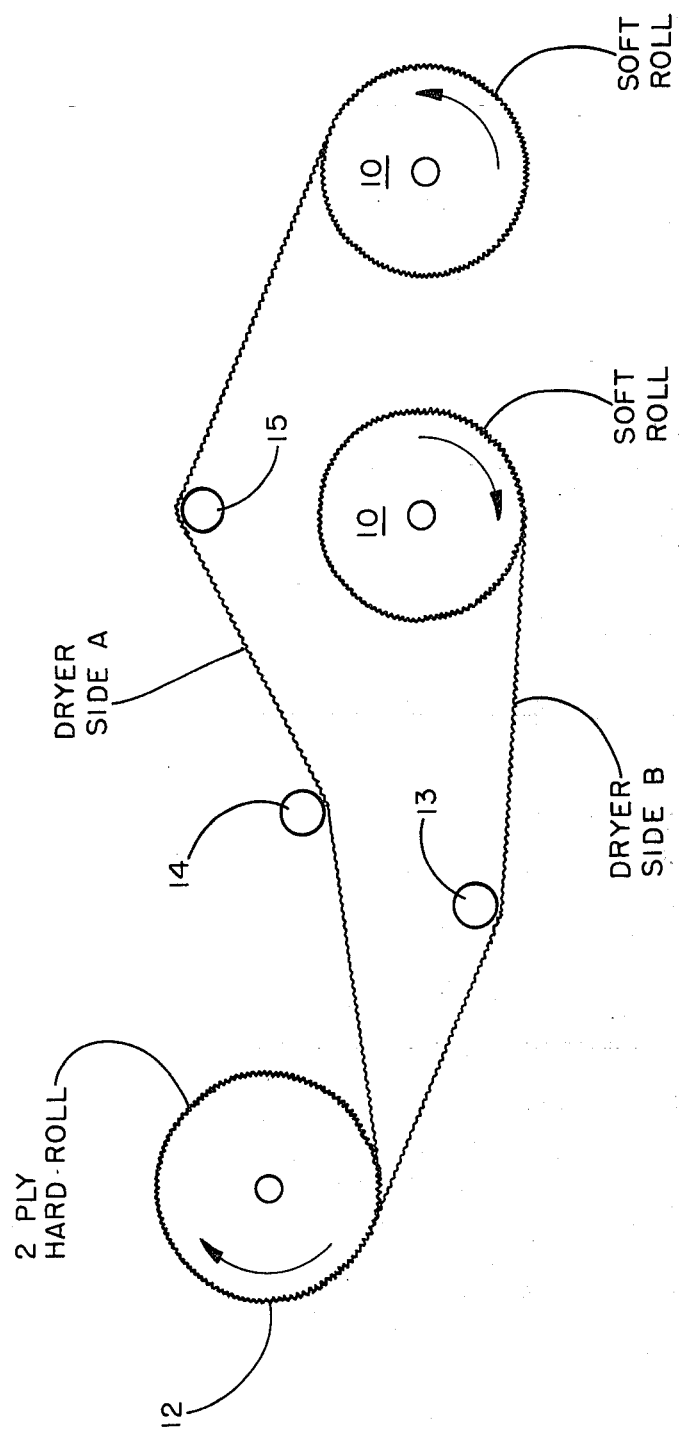
FIG. 3 is a schematic view illustrating the winding of two soft rolls formed as in FIG. 2, into a two-ply hard roll adapted for conversion into a two-ply tissue product.
Figure 4:
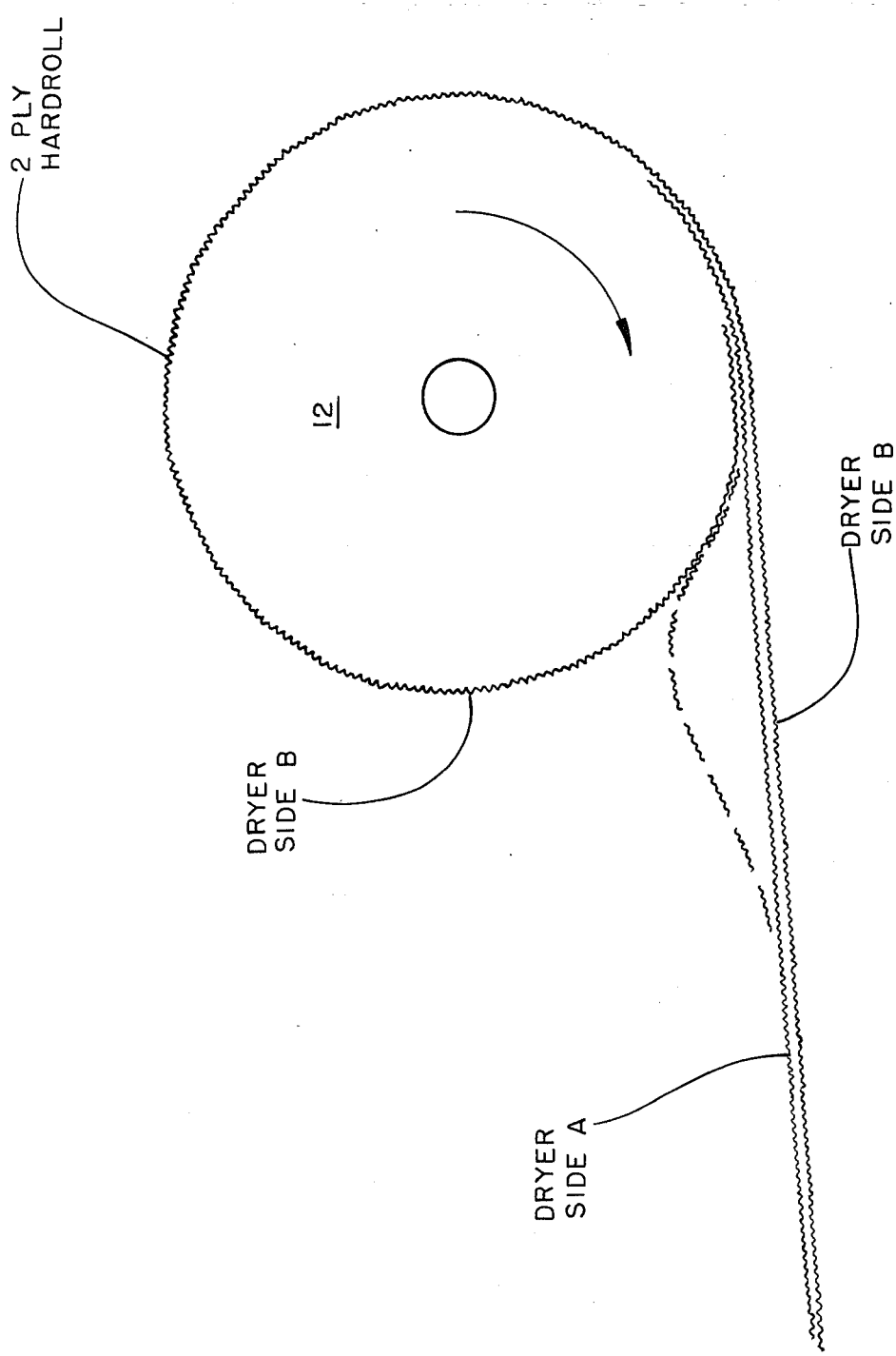
FIG. 4 is a schematic view illustrating the unwinding of the 2 ply roll of FIG. 3 in a converting operation and showing in dotted lines the defect caused by roll blocking.

Referring now to FIG. 3 it is common practice to rewind the soft rolls 10 into a 2 ply hardroll. Also, it is usual to wind the rolls so that in the finished 2 ply product the web face of each ply which is outward is that which contacted the dryer surface. As shown in FIG. 3 the rolls 10 are unwound and directed to a rewind at 12, passing over tension roll 13 in one instance and over the successive rolls 14, 15 in the other. The hard roll 12 is a relatively wide roll and for tissue paper purposes such as facial and toilet tissue is required to be slit into rolls of a few inches in width. To accomplish this the hard 2 ply roll is unwound as illustrated in FIG. 4. The blocking effect noted hereinbefore has a detrimental effect during this unwind. As illustrated by a dash line one ply of an outer layer tends to adhere to the adjacent ply of an inner layer leading to ply separation and sometimes tearing of the webs forming the 2 ply sheet.

It has been found that by the application of an polyvinyl acetate-ethylene copolymer emulsion combined with about 10–33% by weight based on the solids content of the polyvinyl acetate-ethylene copolymer emulsion, of a partially hydrolyzed polyvinyl alcohol which is normally water soluble that the difficulties of sheet blocking (FIG. 4), cleanability of the fabric 1, cleanability of the dryer 5 and consistency of web adhesion to the dryer are improved. More specifically, by providing about 10% of the soluble polyvinyl alcohol with the polyvinyl acetate-ethylene copolymer the blocking of the sheets in the hard roll is reduced by as much as 50–75% and is essentially eliminated at 30%. Also at 30% inclusion of the polyvinyl alcohol the creping action on the dryer has been found to be optimum as to crepe quality and freedom from dryer coating buildup. Additionally at the 30% level fabric cleanability is improved such that more than about 50% and up to about 75% of the polyvinyl acetate-ethylene copolymer binder is washable from the carrying fabric; this is a major improvement over the condition occurring when acetate alone is employed where substantially none of the acetate is removable by washing.

Below about 20% inclusion of the polyvinyl alcohol the cleanability of the fabrics by use of a needle water spray 16 (FIG. 1) is improved but adhesion to the dryer tends to fall somewhat. The combination of the polyvinyl acetate-ethylene copolymer in the noted ranges (10–33% of the polyvinyl alcohol) is effective to provide good adhesive tack properties in the dryer operating temperature range of about 160° F. to 240° F.

The hydrolyzed polyvinyl alcohols having utility in the invention are those which are water soluble, having a molecular weight between about 3,000 and 96,000, which form a hard film when used as the sole creping adhesive, and the desirable tack properties of which are developed at a relatively high temperature, that is about 260° F. Such are exemplified by partially hydrolyzed polyvinyl alcohols marketed by the Monsanto Chemical Company. Per Monsanto brochure Technical Bulletin No. 6082D Gelvatol ® 20-60 is reported as having an average molecular weight of about 96,000, is 88 to 85% hydrolyzed, exhibits a viscosity as an aqueous solution of 21-25 centipoises and has a residual % of polyvinyl acetate of about 20-25. Gelvatol ® 40-20 is reported as having an average molecular weight of 3,000, is 77 to 72.9% hydrolyzed, exhibits a viscosity of 2.4-3 centipoises and has a % residual of polyvinyl acetate of 37-42.

The polyvinyl acetate-ethylene copolymer emulsions useful in the practice of the invention are those having a glass transition temperature of between about 0° C. and 10° C. Such are exemplified by Du Pont's Elvace ®

(Registered Trademark) polyvinyl acetate-ethylene emulsions designated in Du Pont's brochure entitled "Users' Guide for Du Pont Elvace ®" (polyvinyl acetate-ethylene copolymer emulsions) as Grades 1875, 1873, and 1872. Grade 1875 has a glass transition temperature of about 5° C. in contrast to polyvinyl acetate which has a glass transition temperature of about 65° C. (The Handbook of Adhesives, Irving Sheist, Second Edition 1977, Van Nostrand Reinhold Company, New York, N.Y.)

The polyvinyl acetate-ethylene copolymer emulsions are readily diluted with water and mixed with the polyvinyl alcohols mentioned above for attainment of the aqueous spray as described in connection with FIG. 2.

As many apparently widely different embodiments of this invention may be made without departing from the spirit and scope thereof, it is to be understood that we do not limit ourselves to the specific embodiments thereof except as defined in the appended claims.

We claim:

1. In a process for manufacturing a soft and absorbent tissue paper web having a basis weight of about 7-40 lbs. per 3,000 square feet, in which process there are steps of:
    (a) drying a moist paper web to a fiber consistency exceeding about 30% and up to about 90%;
    (b) carrying the paper web on a fabric to a rotating cylindrical dryer surface and transferring the web from the fabric to the dryer surface;
    (c) applying an aqueous creping adhesive composition to aid retention of the web on the rotating cylindrical surface and creping the substantially completely dried web from the surface;
the improvement comprising applying as said creping adhesive a composition consisting essentially of a polyvinyl acetate-ethylene copolymer adhesive in emulsion form and a partially hydrolyzed polyvinyl alcohol having a molecular weight of between about 3,000 and 96,000, said polyvinyl acetate-ethylene copolymer having a glass transition temperature of between about 0° C. and 10° C. and being present in said creping adhesive in a quantity of at least 70% by weight based on the solids content of the polyvinyl acetate-ethylene copolymer emulsion, wherein the adhesive tack properties of said creping adhesive are attained at less than 260° F. and substantially no strength is added to said tissue web by said creping adhesive.

2. The process as recited in claim 1, wherein the adhesive tack properties of said creping adhesive are attained at a temperature in the range of from about 160° F. to about 240° F.

3. The process as recited in claim 1 wherein the fabric which carries the web to the rotating cylindrical dryer surface is a transfer and impression fabric having knuckles which compact a minor percentage portion of the surface of the web on the creping dryer and the adhesive retains the knuckled web on the dryer surface until the fiber consistency of the web is at least about 95%.

4. The process as recited in claim 3 wherein the impression fabric knuckles compact about 20% of the surface area of the web on a creping dryer.

5. In a process for manufacturing a soft and absorbent tissue paper web having a basis weight of about 7-40 lbs. per 3,000 square feet, in which process there are steps of:
    (a) drying a moist paper web to a fiber consistency exceeding about 30% and up to about 90%;
    (b) carrying the paper web on a fabric to a rotating cylindrical dryer surface and transferring the web from the fabric to the dryer surface;
    (c) applying an aqueous creping adhesive composition to aid retention of the web on the rotating cylindrical surface and creping the substantially completely dried web from the surface;
    (d) thereafter plying 2 such dried webs together with the web surfaces which engages the dryer surface disposed away from each other so that in a 2 ply roll form the said web surfaces of adjacent turns are in contact;
the improvement comprising applying as said creping adhesive a composition consisting essentially of a polyvinyl acetate-ethylene copolymer adhesive in emulsion form and a partially hydrolyzed polyvinyl alcohol having a molecular weight of between about 3,000 and 96,000, said polyvinyl acetate-ethylene copolymer having a glass transition temperature of between about 0° C. and 10° C. and being present in said creping adhesive in a quantity of at least 70% by weight based on the solid content of the polyvinyl acetate-ethylene copolymer emulsion, wherein the adhesive tack properties of said creping adhesive are attained at less than 260° F. and substantially no strength is added to said tissue web by said creping adhesive

* * * * *